United States Patent [19]

Inoue

[11] 3,873,202

[45] Mar. 25, 1975

[54] DEVICE FOR MOUNTING POLYCHROME HALFTONE NEGATIVES ON SHEET FILM

[76] Inventor: Yoshio Inoue, No. 10, 2-chome, Tanabehigashino-cho, Higashisumiyoshi-ku, Osaka-shi, Osaka-fu, Japan

[22] Filed: Apr. 10, 1974

[21] Appl. No.: 459,853

[30] Foreign Application Priority Data

Apr. 26, 1973 Japan .................................. 48-49388

[52] U.S. Cl. ...................................... 355/88, 355/95

[51] Int. Cl. ............................................ G03b 27/04

[58] Field of Search ............. 355/32, 53, 86, 88, 95, 355/71

[56] References Cited

UNITED STATES PATENTS

| | | | |
|---|---|---|---|
| 2,974,579 | 3/1961 | Echelson et al. | 355/95 |
| 3,000,737 | 9/1961 | Barnhart | 355/32 X |
| 3,241,472 | 3/1966 | Robertson | 355/95 |
| 3,566,763 | 3/1971 | Knopf | 355/95 X |
| 3,572,926 | 3/1971 | Coil et al. | 355/53 |
| 3,580,676 | 5/1972 | Sarka et al. | 355/86 |
| 3,602,591 | 8/1971 | Bouwer et al. | 355/95 X |
| 3,635,560 | 1/1972 | Hulen | 355/86 |
| 3,639,056 | 2/1972 | Gerson | 355/95 X |

*Primary Examiner*—Richard A. Wintercorn
*Attorney, Agent, or Firm*—Wenderoth, Lind & Ponack

[57] ABSTRACT

A device enabling to mount repeatedly halftone negatives for each color for polychrome printing in predetermined positions on sheet film comprising a negative fixing implement capable of detachably fixing a halftone negative by means of positioning holes provided thereon, the negative fixing implement adapted to be movable in desired directions being provided on a work table for placing sheet film thereon, the amount of movement of the fixing implement actuated by longitudinal, transverse and rotary shifting mechanisms being detected by detecting mechanisms respectively, said amount of movement being memorized by memory circuits respectively, the shifting mechanisms being actuated by respective comparison circuits capable of comparing the position of the fixing implement memorized by the memory circuits with the position of the fixing implement after removal thereof thereby enabling to return the fixing implement to the memorized position thereof.

1 Claim, 4 Drawing Figures

DEVICE FOR MOUNTING POLYCHROME HALFTONE NEGATIVES ON SHEET FILM

This invention relates to a device for mounting halftone negatives for polychrome printing in predetermined positions on sheet film for each color.

In the conventional polychrome printing method, halftone negatives were prepared by color analytic photography for each picture, a minimum of four halftone negatives for each color being prepared for each picture.

Halftone negatives for yellow color, for example, were mounted in prescribed positions on large-sized transparent sheet film by means of transparent adhesive tape in accordance with a layout. Then, another sheet film was placed on said sheet film, halftone negatives for another color being mounted on the latter sheet film so as to accurately coincide with the respective halftone negatives for yellow color by the help of a magnifier or the like, this process being repeated for the number of colors used.

Consequently, the mounting operation of halftone negatives on sheet film involves a great deal of time and labor, the manual operation being monotonous and tedious despite the fact that patient skill was required, thus errors being liable to occur frequently resulting in printing shears. This is reason why polychrome printing of high quality is unobtainable.

An object of this invention is to minimize the disadvantages involved in the manual mounting of halftone negatives on sheet film.

According to the method of this invention, film is punched prior to exposure and fixed to the exposure surface of a camera by inserting pins provided on said exposure surface through the punched holes thereby enabling to obtain perfect registration of halftone negatives by registering the punched holes with each other. Each time a halftone negative is mounted in a predetermined position on sheet film in accordance with the layout by making use of the holes preliminarily punched in predetermined positions on each halftone negative, the mounting position thereof is memorized electrically, subsequent halftone negatives being mounted in the predetermined position on the sheet film by automatically reproducing the memorized position thereon. Thus, the present invention has for an object to provide a device for mechanically mounting halftone negatives for polychrome printing in predetermined positions on each sheet film thereby enabling to preclude mounting errors.

This and other objects are accomplished by the parts, improvements, combinations and arrangements constituting the present invention, a preferred embodiment of which is shown by way of example in the annexed drawings and herein described in detail. Of the drawings.

Figure 1:
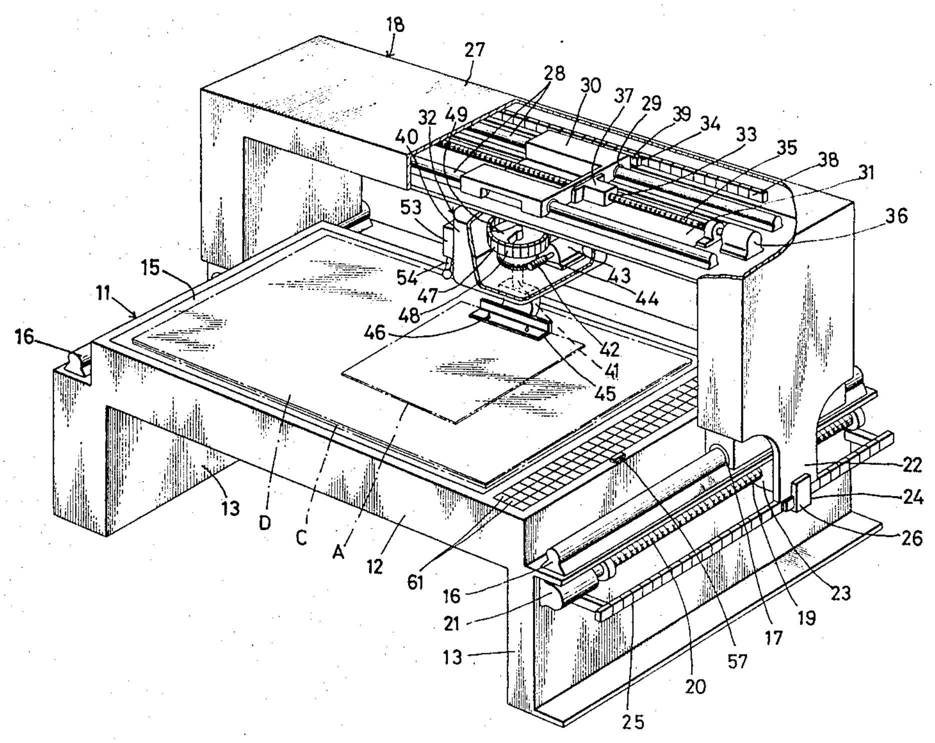
FIG. 1 is a perspective view, broken away in part, showing the construction of the device according to this invention.
Figure 2:
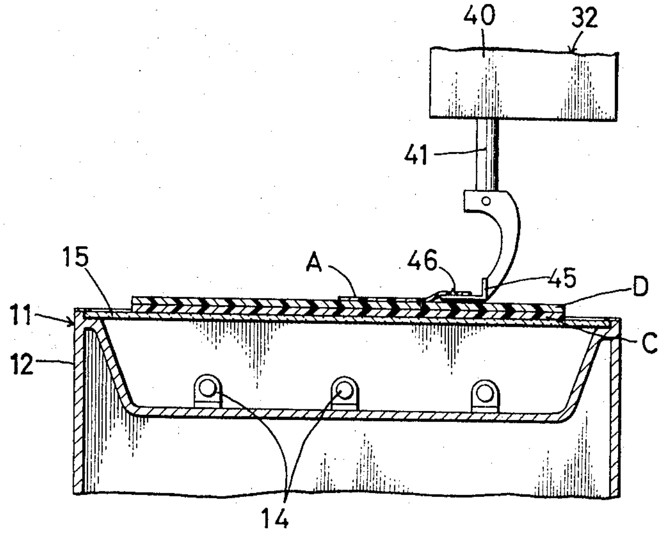
FIG. 2 is a vertical, sectional view of a work table of the same.

In the embodiment shown in FIGS. 1 and 2, the numeral 11 designates a work table, leg walls 13 being provided on both sides of a horizontal base plate 12, a fluorescent lamp 14 being built in the hollow interior of the base plate 12, lactescent sheet glass 15 being extended over the upper surface of the base plate 12.

To the outside of the leg walls 13 of the work table 11 are horizontally secured longitudinal guide rails 16, a movable frame 18 in the shape of a gate transversely astride the base plate 12 being provided on the work table 11, said movable frame 18 being provided with rotary members 17 at the lower ends thereof so as to be longitudinally movable on the guide rails 16.

On the outside of the right-hand leg wall 13 in FIG. 1 is provided a shifting mechanism for longitudinally moving the movable frame 18. The shifting mechanism comprises a threaded shaft 20 rotatably supported at both ends thereof by bearings secured to the leg wall 13, the threaded shaft 20 being connected at one end thereof to the output axis of a pulse motor 21 secured to the leg wall 13.

On the lower part of the movable frame 18 on the side of the threaded shaft 20 is provided a projecting piece 22, a shift nut 23 engageable with the threaded shaft 20 being secured to the projecting piece 22 thereby enabling to move the movable frame 18 longitudinally in accordance with the clockwise or counterclockwise rotation of the threaded shaft 20 actuated by the motor 21.

Adjacent to the shifting mechanism 19 is provided a shift amount detecting mechanism 24 for electrically detecting the amount of longitudinal movement of the movable frame 18.

In the embodiment of this invention, rectilineal magnetic scale 25 is used for the detecting mechanism 24, the magnetic scale 25 in which the N and S poles are alternately arranged being secured to the leg wall 13 in parallel with the threaded shaft 20, a location senser 26 comprising a magnetic flux responsive to the scale 25 being mounted on the projecting piece 22, whereby the amount of longitudinal movement of the movable frame 18 is electrically detected by means of the scale 25 and the senser 26.

Within a horizontal member 27 of the movable frame 18 are provided a pair of transversely parallel guide rails 28, within said horizontal member 27 being also provided a transversely movable member 30 supported at both ends thereof by the guide rails 28 through rotatry members 29 and transversely movable along the guide rails 28, on the lower part of the transversely movable member 30 being mounted a negative fixing implement 32 projecting downward from a transversely elongated hole 31 bored through the bottom wall of the horizontal member 27 so as to face the base plate 12 of the work table 11.

Within the horizontal member 27 are provided a shifting mechanism 34 for the transversely movable member 30 and a shift amount detecting mechanism 34 for electrically detecting the amount of transverse movement of the transversely movable member 30.

The shifting mechanism 33 comprises a threaded shaft 35 rotatably supported at both ends thereof by bearings, one end of the threaded shaft 35 being connected to the output axis of a pulse motor 36 secured to the horizontal member 27, a shift nut 37 externally engageable with the threaded shaft 35 being secured to the transversely movable member 30, thereby enabling the transversely movable member 30 to be transversely moved by the rotation of the threaded shaft 35 actuated by the motor 36.

The shift amount detecting mechanism 34 is similar to the corresponding mechanism for longitudinal movement, a rectilineal magnetic scale 38 being secured within the horizontal member 27 so as to be in parallel with the rails 28, a location senser 39 being mounted on the transversely movable member 30 in a position corresponding to said scale 38.

The negative fixing implement 32 comprises a hollow case 40 secured at its upper part to the transversely movable member 30 and coincidentally movable with said member 30 below the horizontal member 27 of the movable frame 18, a pivot 41 being vertically provided within the hollow case 40.

Within the hollow case 40 is mounted a shifting mechanism 44 for actuating the pivot 41 by a pulse motor 43 secured within the case 40 through engaging gears 42, a halftone negative fixing bar 45 having an L-shaped cross section as shown in FIG. 2 being secured to the lower end of the pivot 41 projecting downward from the underside of the hollow case 40, the lower surface of the fixing bar 45 being in a horizontal state slightly spaced from the upper face of the sheet glass 14 of the base plate 12, on both sides of the upper surface of the horizontal portion of the fixing bar 45 being erected a pair of fixing pins 46 so as to coincide with a pair of positioning holes 13 formed on the negative (A).

Within the hollow case 40 and at the upper end of the pivot 31 is provided a rotation amount detecting mechanism 47 for electrically detecting the amount of rotation of the negative fixing bar 45.

The rotation amount detecting mechanism 47 comprises a magnetic scale 48, similar to those of the detecting mechanisms 24 and 34, in which the N and S poles are alternately and circularly arranged, the detecting mechanism 47 being secured to the case 40 so as to be free and concentrical relative to the pivot 41, a location senser 49 being mounted on the pivot 41 in a position corresponding to the scale 48, whereby the amount of rotation of the fixing bar 45 is electrically detected by means of the scale 48 and the senser 49.

The negative fixing bar 45 of the negative fixing implement 32 is movable in all directions on the base plate 12 in accordance with the longitudinal movement of the movable frame 18, the transverse movement of the transversely movable member 30 and the rotation of the pivot 41 actuated by the respective shifting mechanisms.

Figure 4:
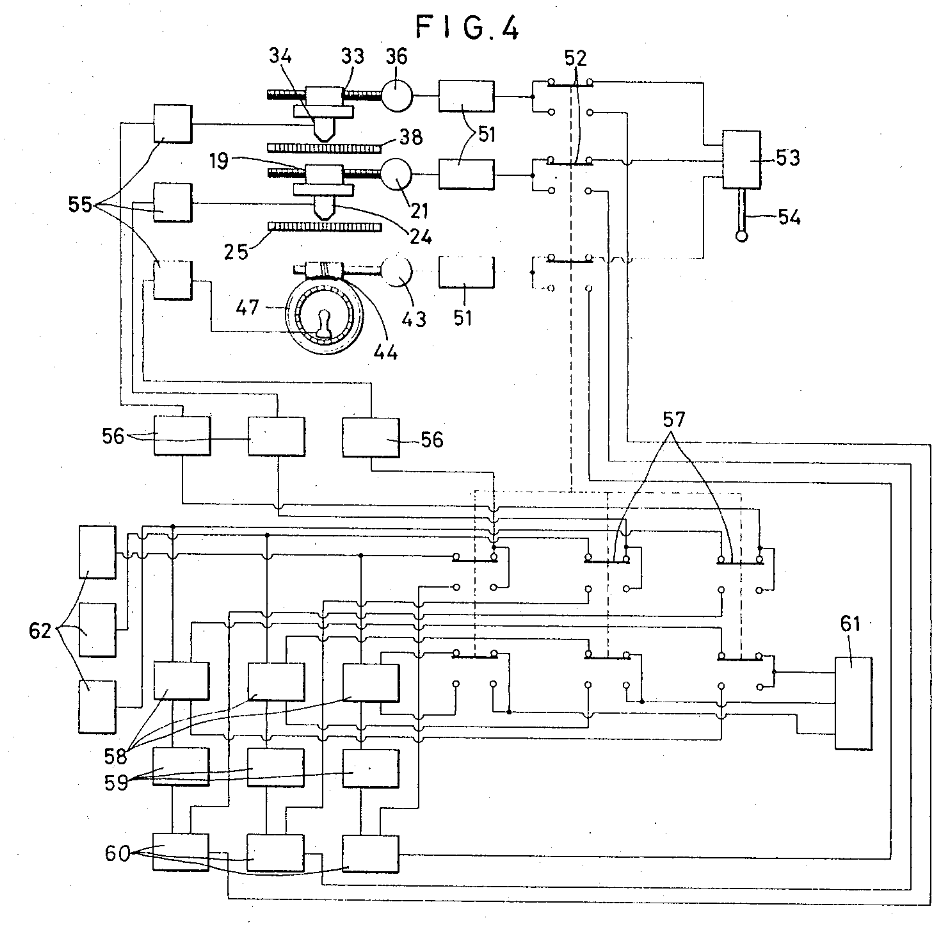
FIG. 4 is a wiring diagram of the same.

An explanation will now be made in reference to FIG. 4 with regard to the function of the shifting mechanisms, the electric circuits for memorizing the position of the negative fixing implement 32 and for returning said implement 32 to the memorized position.

The pulse motors 21, 36 and 43 of the shifting mechanisms 19, 33 and 44 are connected to respective switches of a hand lever 53 through respective drivers 51 and change-over switches 52.

The hand lever 53 comprises a lever means 54 reclinable and rotatable in all directions with a plurality of switches provided therearound, each switch being adapted to actuate a contact on the side to which the lever body 54 is reclined or rotated. Said switches are connected to the pulse motors 21, 36 and 43 respectively thereby enabling to move or rotate the negative fixing implement 32.

The hand lever 53 is mounted suitably, for example, on one side of the negative fixing implement 32.

The location sensers 26, 39 and 49 of the detecting mechanisms 24, 34 and 47 are connected to counters 56 through detectors 55 respectively, the counters 56 being connected to memory circuits 58 respectively through memory reversion instruction change-over switches 57 associated with the change-over switches 52.

To the output side of the memory circuits are connected comparison circuits 60 through preset counters 59 respectively, to the input side of the comparison circuits 60 being connected the contacts for reversion instruction of the change-over switches 52.

The comparison circuits 60 are connected at the output side thereof to the contacts on the reversion instruction side of the predetermined change-over switches 57, the memory actuation input side and the memory discharge output side of the memory circuits 58 being connected to the corresponding contacts of the change-over switches 57 respectively, to the other corresponding contacts of the switches 57 being connected switch group 61 for memory or reversion instruction and address setting thereby enabling to memorize the location of the negative fixing implement 32 and to return said implement 32 to the memorized position by the operation of the switch group 61 and the changeover of the switches 57.

Digital printers 62 are provided between the counters 56 and the memory circuits 58 for numerically printing the amount of movement and rotation transmitted from the respective detecting mechanisms simultaneously with the memory instruction thereby enabling to permanently reproduce the position of the nagative fixing implement 32.

It is to be understood that the change-over switches 57 and the switch group 61 are to be provided in a suitable position on the upper surface of the work table 11.

Figure 3:
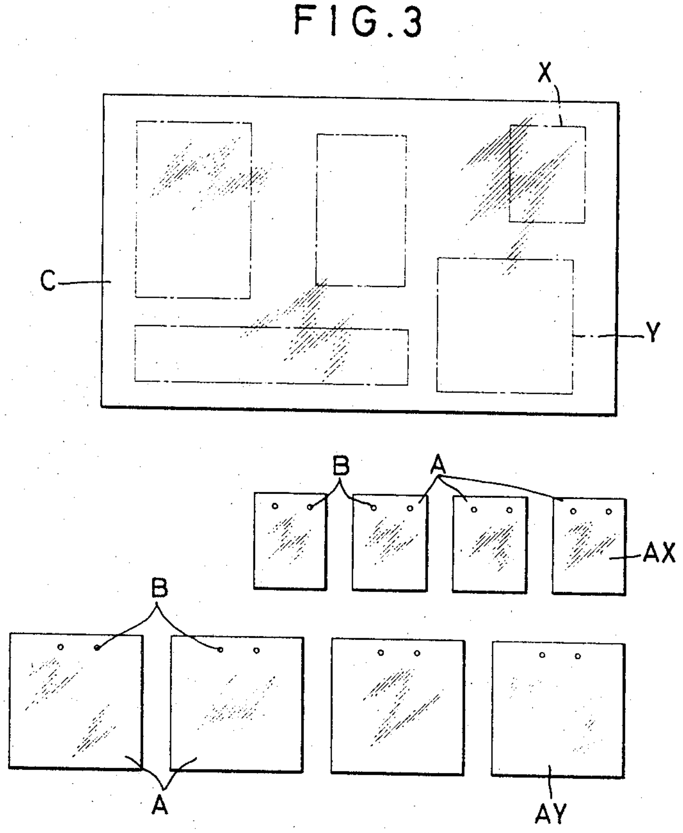
FIG. 3 is plan view of a layout sheet and halftone negatives for use in the same.

In FIG. 3, (C) designates a layout sheet showing the predetermined positions for mounting halftone negatives. Halftone negatives (A) are to be prepared in more than four kinds for each picture, for example, for yellow, magenta, cyanin, black and the like, the halftone negatives (A) being mounted on transparent sheet film (D) of the same size with the layout sheet (C).

The function of the foregoing embodiment will now be explained in detail. A layout sheet (C) showing predetermined positions thereon is placed on the sheet glass 15 of the work table 11 lighted by a fluorescent lamp 14, transparent sheet film (D) being placed on the layout sheet (C), both the sheet film (D) and layout sheet (C) being secured to the sheet glass 15 by means of adhesive tape or the like.

In this state, the memory reversion change-over switch 57 is turned on to the memory side, a negative for yellow color (AX) for the picture (X) prescribed on the layout sheet (C) being fixed to the fixing bar 45 of the fixing implement 32 located in an arbitrary position by inserting the pins 41 through the positioning holes (B) so that the negative (A) will be placed on the sheet film (D) as shown in FIG. 2.

Then, the lever member 54 of the hand lever 53 is manually reclined or rotated in the direction toward which the operator desires to move the fixing implement 32, the shifting mechanisms 19, 33 and 44 being actuated by the operation of the hand lever 53 thereby imparting longitudinal, transverse and rotary movement to the fixing implement 32. When the position of the negative (AX) coincides with the position (X) prescribed by the layout, the negative (AX) is mounted on the sheet film (D) by adhesive tape, then said negative (AX) being detached from the pins 46.

Subsequently, if No. 1 of the memory instruction switch group 61 is pressed, the amounts of movement and rotation of the fixing implement 32 detected by the detecting mechanisms 24, 34 and 47 are transmitted through the counters 56 to the memory circuits 58 respectively, whereby the stopping position is not only memorized by the circuits 58 but also recorded by the printers 62 in numbers of 5 – 6 figures, said No. 1 switch being determined as Memory Address No. 1.

Next, the negative for yellow color (AY) for the picture (Y) is fixed to the fixing bar 45, the negative (AY) being moved to the position prescribed by the layout according to the similar process, No. 2 of the memory instruction switch group being pressed after said negative (AY) has been mounted on the sheet film (D) so as to memorize the predetermined position, the same memorizing process being repeated for the remaining negatives for the rest of the pictures.

On completion of the mounting of the negatives for yellow color on the sheet film for yellow color (D) and the memorization of the mounting positions respectively, the sheet film (D) is removed from the sheet glass 15 leaving the layout sheet (C) as it stands, a new sheet film (D) being placed on the layout sheet (C) and secured in the same position as before.

Then, No. 1 of the switch group 61 is pressed after the memory reversion change-over switch 57 has been turned on to the reversion side. Thus, the values of the longitudinal and transverse movement and the rotation angle memorized at Address No. 1 are compared by the comparison circuits 60 with the values relative to the present position of the fixing implement 32, the pulse motors 21, 36 and 43 being electrified until said valves coincide with the memorized ones, whereby the fixing implement 32 is returned by the shifting mechanisms to the identical position in which the negative for yellow color for the first picture was mounted.

After the stoppage of the fixing implement 32, a negative for magenta color is fixed to the pins 46 of the fixing bar 45 by means of the positioning holes (B), said negative being thus mounted on the sheet film (D).

As described hereinbefore, at each mounting of a negative for each color in the predetermined position for each picture, the fixing implement 32 is moved after pressing the switch 61 which memorizes the relative position, whereby the halftone negatives are mounted in the predetermined positions respectively. Since the halftone negatives for each color can be mounted on the sheet film under the identical conditions, this invention has a great advantage in that the negative mounting process can be infallably conducted without the help of a magnifying lens or the like, and moreover the mounting positions are permanently reproducible.

What is claimed is:

1. A device for mounting polychrome printing halftone negatives in predetermined positions on sheet film characterized in that a negative fixing implement capable of detachably fixing halftone negatives by means of positioning holes bored through said negatives is provided on a work table for placing sheet film thereon, the negative fixing implement being adapted to be movable on the work table by longitudinal, transverse and rotary shifting mechanisms provided with driving means respectively, shift amount detecting mechanisms being provided along the direction of the respective shifting mechanisms for electrically detecting the longitudinal, transverse and rotary movements of the negative fixing implement actuated by said shifting mechanisms, the negative mounting position of the fixing implement being memorized by memorizing the amount of movement thereof detected by the detecting mechanisms respectively, memory reversion circuits for actuating the driving means of the shifting mechanisms and the detecting mechanisms being provided thereby enabling to return automatically the fixing implement to the memorized position after its removal on memorization.

* * * * *